(12) United States Patent
Bayrakeri et al.

(10) Patent No.: US 8,255,956 B2
(45) Date of Patent: Aug. 28, 2012

(54) SYSTEM AND METHOD FOR DELIVERY OF SHORT-TIME DURATION VIDEO SEGMENTS

(75) Inventors: Sadik Bayrakeri, Foster City, CA (US); Donald F. Gordon, Los Altos, CA (US); Edward A. Ludvig, Redwood City, CA (US); John P. Comito, Redwood City, CA (US); Jeremy S. Edmonds, Redwood City, CA (US); Eugene Gershtein, Redwood City, CA (US)

(73) Assignee: Cox Communications, Inc., Atlanta, GA (US)

( * ) Notice: Subject to any disclaimer, the term of this patent is extended or adjusted under 35 U.S.C. 154(b) by 447 days.

(21) Appl. No.: 11/400,691

(22) Filed: Apr. 7, 2006

(65) Prior Publication Data
US 2006/0184979 A1 Aug. 17, 2006

Related U.S. Application Data

(60) Division of application No. 09/604,835, filed on Jun. 27, 2000, now abandoned, which is a continuation-in-part of application No. 09/524,854, filed on Mar. 14, 2000, now Pat. No. 7,127,737, and a continuation-in-part of application No. 09/538,562, filed on Mar. 29, 2000, and a continuation-in-part of application No. 09/539,228, filed on Mar. 30, 2000, now abandoned.

(60) Provisional application No. 60/141,533, filed on Jun. 28, 1999, provisional application No. 60/178,100, filed on Jan. 26, 2000.

(51) Int. Cl.
*G06F 3/00* (2006.01)
*G06F 13/00* (2006.01)
*H04N 5/445* (2011.01)

(52) U.S. Cl. ............... 725/54; 725/61; 725/95; 725/100; 725/103; 725/105; 725/120; 725/86; 725/87

(58) Field of Classification Search .................. 725/86, 725/87, 90, 93, 95, 38–61, 91, 97–100, 102–121
See application file for complete search history.

(56) References Cited

U.S. PATENT DOCUMENTS 4,290,063 A 9/1981 Traster ..................... 340/723
(Continued)

FOREIGN PATENT DOCUMENTS
WO WO/9831115 * 7/1998

*Primary Examiner* — Pankaj Kumar
*Assistant Examiner* — Alazar Tilahun
(74) *Attorney, Agent, or Firm* — Merchant & Gould

(57) ABSTRACT

A system and method for efficient delivery of video segments. One embodiment relates to the delivery of short-time duration video segments. The video segments may be delivered as part of a media-rich interactive program guide (IPG) or for some other application. The system and method provides a viewer with access to a video segment starting at its beginning (or any other selectable point within the video segment). Such access may be provided using a server-centric interactive technique. The server-centric technique may involve use of a demand-cast system and method. Demand-cast messaging may occur between a session manager, transport stream generator, and terminal. For example, a video object on a screen may be activated by a viewer using a remote control for a terminal. Activation of the object may cause transmission of a request from the terminal to a session manager for a video segment corresponding to the object. In response to the request, the session manager may initiate a process to accomplish delivery of the video segment from a transport stream generator to the terminal.

18 Claims, 9 Drawing Sheets

U.S. PATENT DOCUMENTS

| | | | |
|---|---|---|---|
| 4,437,093 A | 3/1984 | Bradley | 340/726 |
| 4,496,976 A | 1/1985 | Swanson et al. | 358/147 |
| 4,506,387 A | 3/1985 | Walter et al. | |
| 4,520,356 A | 5/1985 | O'Keefe et al. | 340/750 |
| RE32,187 E | 6/1986 | Barda et al. | 340/706 |
| 4,600,921 A | 7/1986 | Thomas | 340/825.31 |
| 4,633,297 A | 12/1986 | Skerlos et al. | 358/22 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,461,415 A | 10/1995 | Wolf et al. | |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,550,576 A | 8/1996 | Klosterman | 348/6 |
| 5,552,837 A | 9/1996 | Mankovitz | 348/734 |
| 5,553,123 A | 9/1996 | Chan et al. | 379/102 |
| 5,559,549 A | 9/1996 | Hendricks et al. | |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,592,551 A | 1/1997 | Lett et al. | 380/20 |
| 5,600,364 A * | 2/1997 | Hendricks et al. | 725/9 |
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,274 A | 4/1997 | Roop et al. | 348/461 |
| 5,619,383 A | 4/1997 | Ngai | 360/20 |
| 5,621,579 A | 4/1997 | Yuen | 386/121 |
| 5,630,119 A | 5/1997 | Aristides et al. | 395/601 |
| 5,644,354 A | 7/1997 | Thompson et al. | 348/13 |
| 5,659,367 A | 8/1997 | Yuen | 348/465 |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,694,176 A | 12/1997 | Bruette et al. | |
| 5,701,383 A | 12/1997 | Russo et al. | 386/46 |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,734,853 A | 3/1998 | Hendricks et al. | |
| 5,751,282 A * | 5/1998 | Girard et al. | 715/721 |
| 5,754,940 A | 5/1998 | Smith et al. | 455/5.1 |
| 5,757,416 A | 5/1998 | Birch et al. | 348/6 |
| 5,764,739 A | 6/1998 | Patton et al. | 379/106.03 |
| 5,771,064 A | 6/1998 | Lett | 348/10 |
| 5,790,198 A | 8/1998 | Roop et al. | 348/460 |
| 5,790,806 A | 8/1998 | Koperda | 395/200.82 |
| 5,793,438 A | 8/1998 | Bedard | |
| 5,801,747 A | 9/1998 | Bedard | |
| 5,801,753 A | 9/1998 | Eyer | 348/13 |
| 5,801,787 A | 9/1998 | Schein et al. | 348/569 |
| 5,802,448 A | 9/1998 | Brown et al. | |
| 5,805,204 A | 9/1998 | Thompson et al. | 348/13 |
| 5,808,608 A | 9/1998 | Young et al. | 345/327 |
| 5,809,204 A | 9/1998 | Young et al. | 386/83 |
| 5,812,205 A | 9/1998 | Milnes et al. | 348/460 |
| 5,815,145 A * | 9/1998 | Matthews, III | 725/41 |
| 5,819,036 A | 10/1998 | Adams et al. | |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |
| 5,844,620 A | 12/1998 | Coleman | 348/461 |
| 5,850,218 A | 12/1998 | LaJoie et al. | 345/327 |
| 5,852,478 A | 12/1998 | Kwoh | 348/734 |
| 5,854,840 A | 12/1998 | Cannella, Jr. | 380/9 |

| | | | | | | |
|---|---|---|---|---|---|---|
| 5,870,150 A | 2/1999 | Yuen ............... 348/553 | | 6,201,536 B1 * | 3/2001 | Hendricks et al. ........ 715/716 |
| 5,870,474 A | 2/1999 | Wasilewski et al. ...... 380/21 | | 6,484,318 B1 * | 11/2002 | Shioda et al. ........... 725/110 |
| 5,880,768 A | 3/1999 | Lemmons ............... 348/1 | | 6,532,591 B1 * | 3/2003 | Arai et al. ............. 725/132 |
| 5,915,068 A | 6/1999 | Levine ............... 386/83 | | 6,543,053 B1 * | 4/2003 | Li et al. .............. 725/88 |
| 5,917,830 A | 6/1999 | Chen et al. | | 6,563,515 B1 | 5/2003 | Reynolds et al. |
| 5,940,738 A * | 8/1999 | Rao ................. 725/103 | | 6,718,552 B1 | 4/2004 | Goode |
| 5,949,476 A | 9/1999 | Pocock et al. ......... 348/24 | | 7,065,709 B2 | 6/2006 | Ellis et al. |
| 6,005,561 A | 12/1999 | Hawkins et al. | | 7,096,484 B2 | 8/2006 | Mao et al. |
| 6,014,694 A | 1/2000 | Aharoni et al. | | 7,370,342 B2 | 5/2008 | Ismail et al. |
| 6,154,772 A | 11/2000 | Dunn et al. | | 2002/0049971 A1 | 4/2002 | Augenbraun et al. |
| 6,177,931 B1 | 1/2001 | Alexander et al. | | 2005/0071882 A1 | 3/2005 | Rodriguez et al. |
| 6,198,478 B1 | 3/2001 | Ota et al. | | | | |

* cited by examiner

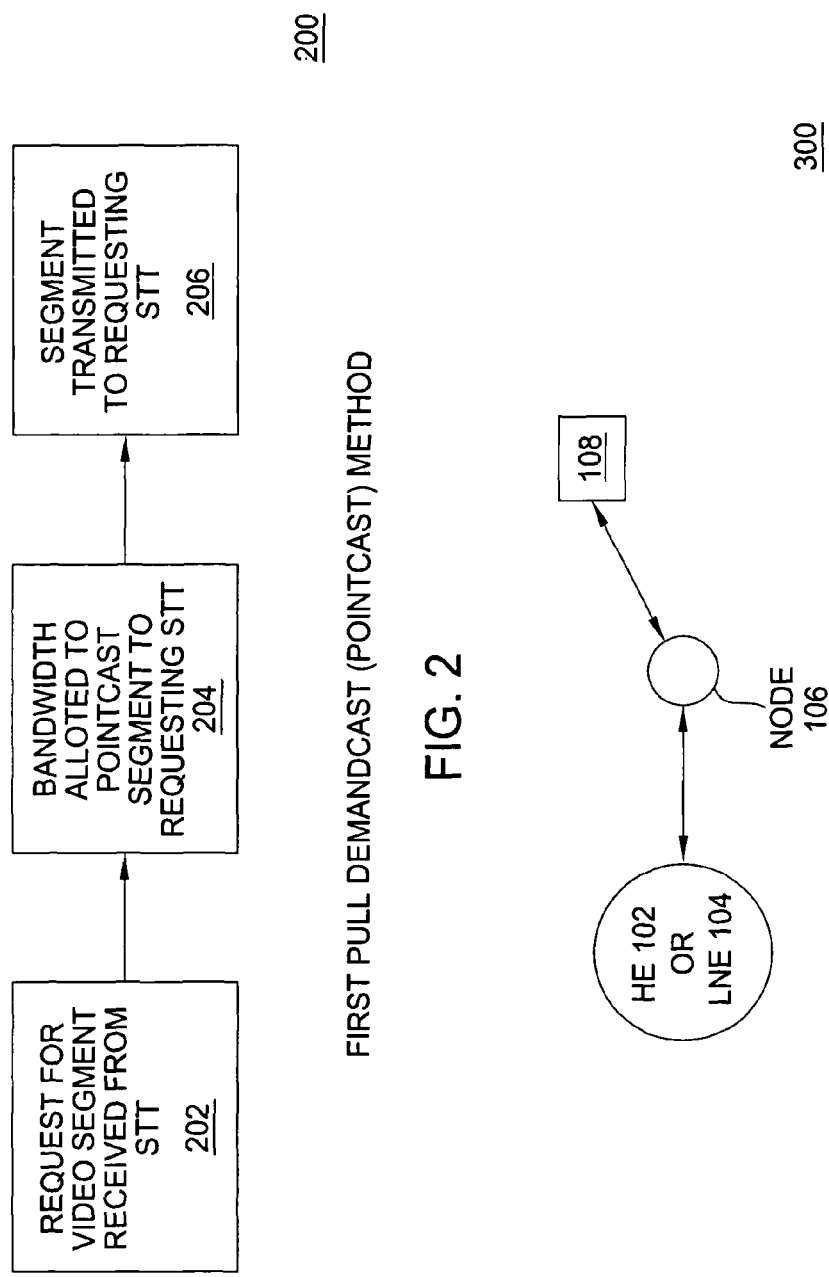

SECOND PULL DEMANDCAST (NARROWCAST) METHOD

SECOND PULL DEMANDCAST (NARROWCAST) TOPOLOGY

TSG-TO-TERMINAL COMMUNICATION:

CONTENTS OF DEMAND-CAST INDEX TABLE

| |
|---|
| TABLE VERSION NUMBER ( INCREMENTED WHEN TABLE CONTENT CHANGES ) |
| LIST OF AVAILABLE DEMAND-CAST STREAMS |
| IP ADDRESS FOR THE SOURCE TSG |
| MUX CHANNEL NUMBER WITHIN THE SOURCE TSG |
| TIME OF DAY AND DAY OF WEEK |

FIG. 8

TERMINAL-TO-SM COMMUNICATION:

MESSAGE CONTENT

| |
|---|
| DEMAND-CAST STREAM ID |
| TERMINAL ID |
| IP ADDRESS FOR THE SOURCE TSG |
| MUX CHANNEL NUMBER WITHIN THE SOURCE TSG |
| MESSAGE INFORMATION ( ACQUISITION, RELEASE, OR REQUEST ) |

FIG. 9

SM-TO-TSG COMMUNICATION:

MESSAGE CONTENT

| DEMAND - CAST STREAM ID |
| MUX CHANNEL NUMBER WITHIN THE SOURCE TSG |
| MESSAGE / COMMAND ( STREAM RELEASED, STREAM REQUESTED, OR RESET ) |

FIG. 10

TSG-TO-SM COMMUNICATION:

MESSAGE CONTENT

| DEMAND - CAST STREAM ID |
| MUX CHANNEL NUMBER WITHIN THE SOURCE TSG |
| IP ADDRESS FOR THE SOURCE TSG |
| ACKNOWLEDGMENT ( OF STREAM RELEASE, OF STREAM REQUEST, OR OF RESET ) |

FIG. 11

SYSTEM AND METHOD FOR DELIVERY OF SHORT-TIME DURATION VIDEO SEGMENTS

RELATED APPLICATIONS

This application is a divisional of U.S. patent application Ser. No. 09/604,835, filed Jun. 27, 2000 now abandoned, entitled "SYSTEM AND METHOD FOR DELIVERY OF SHORT-TERM DURATION OF VIDEO SEGMENTS," which application claims the benefit of U.S. Provisional Patent Application Ser. No. 60/141,533, filed Jun. 28, 1999, entitled "SERVER-CENTRIC SHORT-TIME DURATION VIDEO SEGMENT DELIVERY PROCESS IN AN INTERACTIVE TELEVISION ENVIRONMENT." U.S. patent application Ser. No. 09/604,835 also claims the benefit of U.S. Provisional Patent Application Ser. No. 60/178,100, filed Jan. 26, 2000, entitled "BANDWIDTH MANAGEMENT TECHNIQUES FOR DELIVERY OF INTERACTIVE PROGRAM GUIDE."

U.S. patent application Ser. No. 09/604,835 is a continuation-in-part of U.S. Pat. No. 7,127,737, filed Mar. 14, 2000 now U.S. Pat. No. 7,127,737, entitled "BANDWIDTH MANAGEMENT TECHNIQUES FOR DELIVERY OF INTERACTIVE PROGRAM GUIDE." U.S. patent application Ser. No. 09/604,835 is also a continuation-in-part of U.S. Pat. No. 7,607,152, filed Mar. 29, 2000, entitled "DEMAND-CAST SYSTEM AND BANDWIDTH MANAGEMENT FOR DELIVERY OF INTERACTIVE PROGRAMMING." U.S. patent application Ser. No. 09/604,835 is also a continuation-in-part of U.S. patent application Ser. No. 09/539,228, filed Mar. 30, 2000 now abandoned, entitled "MESSAGING PROTOCOL FOR DEMAND-CAST SYSTEM AND BANDWIDTH MANAGEMENT."

BACKGROUND OF THE INVENTION

1. Field of the Invention

The invention relates to communications systems in general. More specifically, the invention relates to video communications systems.

2. Description of the Background Art

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, conventional electronic program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Such slow database acquisition may result in out of date database information or, in the case of a pay per view (PPV) or video on demand (VOD) system, limited scheduling flexibility for the information provider.

Of particular interest, conventional electronic program guides are generally not media-rich. They are often limited to text and graphics generated at the STT. If they do include video content, such video content is typically limited to a single on-going video broadcast of previews and advertisements.

Moreover, for such video broadcasts, only the portion of the video that is broadcast subsequent to tuning to the electronic program guide is accessible. Previous time portions of the video broadcast remain inaccessible (at least until the video is re-broadcast). This disadvantage applies to viewing any broadcast video, not only broadcast video for an electronic program guide.

SUMMARY OF THE INVENTION

The present invention relates to a system and method for efficient delivery of video segments. One embodiment of the present invention relates to the delivery of short-time duration video segments. The short-time duration video segments may be delivered as part of a media-rich interactive program guide (IPG) or for some other application.

The present invention provides a viewer with access to a video segment starting at its beginning (or any other selectable point within the video segment). Such access may be provided using a server-centric interactive technique. The server-centric technique may involve use of a demand-cast system and method.

BRIEF DESCRIPTION OF THE DRAWINGS

The teachings of the present invention can be readily understood by considering the following detailed description in conjunction with the accompanying drawings.

FIG. 2 is a flow chart showing a first pull method for demand-casting video segments in accordance with an embodiment of the present invention.

FIG. 3 depicts a first pull topology for demand-casting video segments in accordance with an embodiment of the present invention.

FIG. 8 depicts an embodiment for the content of the demand-cast index table.

FIG. 9 depicts one embodiment for the contents of the messages sent from the terminal to the SM.

FIG. 10 depicts one embodiment for the contents of the messages sent from the SM to the TSG.

FIG. 11 depicts one embodiment for the contents of the acknowledgement messages sent by the TSG back to the SM.

DESCRIPTION OF THE SPECIFIC EMBODIMENTS

I. Illustrative Communications Network

Figure 1:
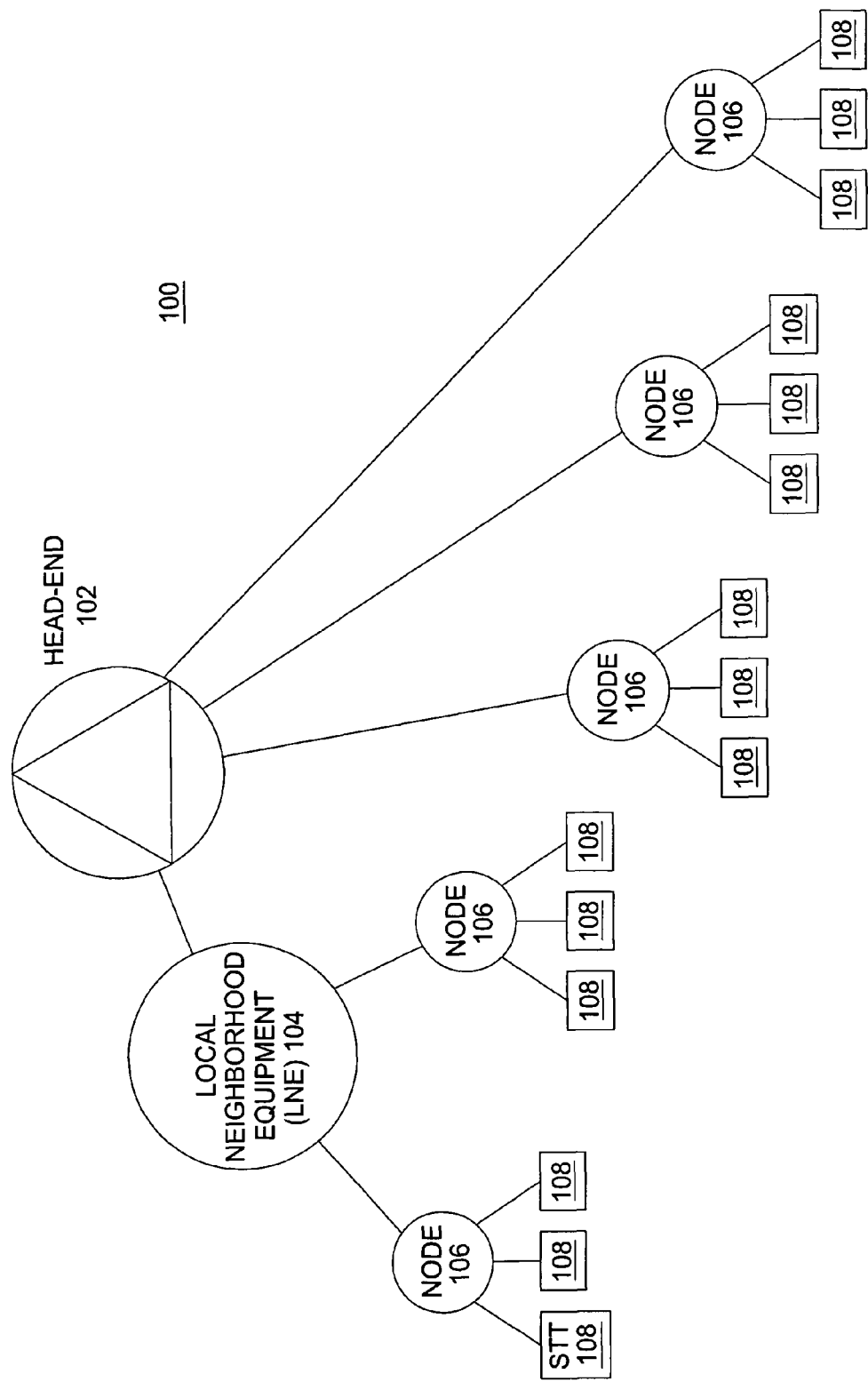
FIG. 1 depicts an illustrative communications network for distributing video segments to a plurality of terminals in accordance with an embodiment of the present invention.

FIG. 1 depicts an illustrative communications network 100 for distributing video segments to a plurality of terminals in accordance with an embodiment of the present invention. The illustrative network 100 comprises a cable distribution network, but other types of distribution networks may also be used within the spirit and scope of the present invention.

The illustrative network 100 includes one or more head-ends 102, one or more centers for local neighborhood equipment 104, a plurality of distribution nodes 106, and a plurality of subscriber stations 108. The local neighborhood equipment (LNE) 104 may be located, for example, at remote hubs of a cable distribution network. The end-user terminals 108 may comprise, for example, interactive set-top terminals (STT) or other devices with similar interactive functionalities.

II. Example Methods and Topologies

In the present application, the demand-cast term is used to refer to the process of managing and delivering content to one or more users depending on user demand for the content. FIGS. 2-7 depicts various methods and topologies for demand-casting video segments in accordance with embodiments of the present invention. The various methods/topologies are given for purposes of edification and are not meant to limit the scope of the present invention.

FIG. 2 is a flow chart showing a first pull method 200 for demand-casting video segments in accordance with an embodiment of the present invention. The first pull method 200 involves pointcasting and provides a requesting viewer with access to a video segment starting at its beginning (or any other selectable point within the video segment). As described below, the method 200 includes three steps.

In a first step 202, a request for a video segment is received from a STT 108. The request is transmitted upstream from the STT 108 to the HE 102 or LNE 104 by way of the communications network 100. The upstream transmission may be done via an out-of-band network. Alternatively, the upstream transmission may be done via an in-band network.

In a second step 204, bandwidth to pointcast the requested video segment is allocated in the distribution system for that purpose. For example, as described in more detail below, a bandwidth manager (BWM) within a head-end 102 and/or local neighborhood equipment 104 may allocate within the in-band network the necessary bandwidth to pointcast the requested video segment to the requesting STT 108. Such allocation is performed if sufficient system resources are available to establish such a session.

In a third step 206, the requested video segment is pointcast to the requesting set-top terminal (STT) 108. The pointcast need only be received by the requesting STT 108 and does not need to be received by other STTs 108. The pointcast is sent downstream from the head-end 102 or local neighborhood equipment 104 to the requesting STT 108. The pointcast is performed within the allocated in-band bandwidth.

FIG. 3 depicts a first pull topology for demand-casting video segments in accordance with an embodiment of the present invention. The topology 300 relates to the pull method 200 of FIG. 2. As shown in FIG. 3, the request is transmitted upstream from the requesting STT 108 to the HE 102 or LNE 104 via illustrative communications network 100. Subsequently, the requested video segment is pointcast downstream from the HE 102 or LNE 104 to the requesting STT 108 via the network 100.

Figure 4:
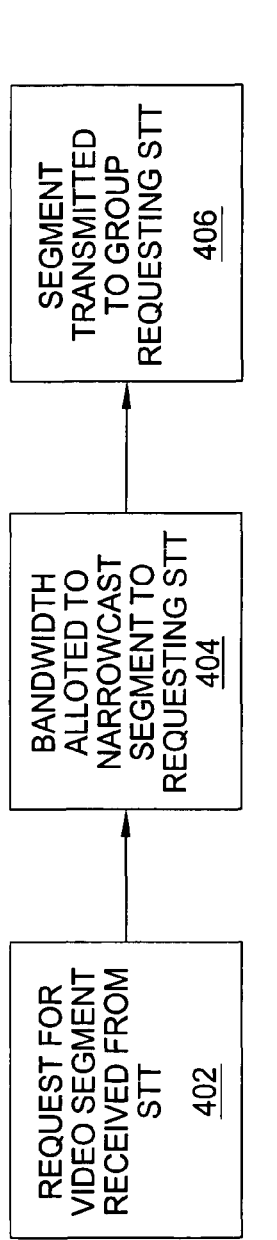
FIG. 4 is a flow chart showing a second pull method for demand-casting video segments in accordance with an embodiment of the present invention.

FIG. 4 is a flow chart showing a second pull method 400 for demand-casting video segments in accordance with an embodiment of the present invention. The method involves narrowcasting and also provides a requesting viewer with access to a video segment starting at its beginning (or any other selectable point within the video segment). As described below, the method 400 includes three steps.

In a first step 402, a request for a video segment is received from a requesting STT 502. The request is transmitted upstream from the requesting STT 502 to the HE 102 or LNE 104 by way of the communications network 100. The upstream transmission may be done via an out-of-band network. Alternatively, the upstream transmission may be done via an in-band network.

In a second step 404, bandwidth to narrowcast the requested video segment is allocated in the distribution system for that purpose. For example, as described below in relation to FIGS. 10 through 13, a bandwidth manager (BWM) within a head-end 102 and/or local neighborhood equipment 104 may allocate within the in-band network the necessary bandwidth to narrowcast the requested video segment to a group 504 of terminals which includes the requesting STT 502. Such allocation is performed if sufficient system resources are available to establish such a session. The group 504 may include terminals 108 in one geographic area or terminals 108 dispersed among different geographic areas but linked, for example, via a network group address.

In a third step 406, the requested video segment is narrowcast to the group 504 of terminals 108. The narrowcast need only be received by terminals 108 within the group 504 and does not need to be received by other STTs 108. The narrowcast is sent downstream from the head-end 102 or local neighborhood equipment 104 to the group 504 of terminals 108. The narrowcast is performed within the allocated in-band bandwidth.

Figure 5:
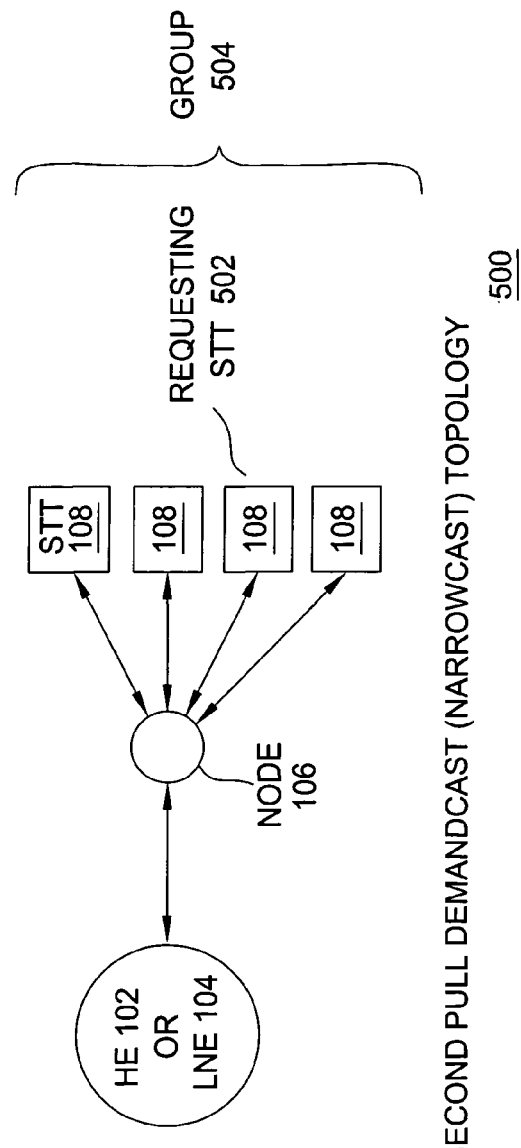
FIG. 5 depicts a second pull topology for demand-casting video segments in accordance with an embodiment of the present invention.

FIG. 5 depicts a second pull topology 500 for demand-casting video segments in accordance with an embodiment of the present invention. The topology 500 relates to the pull method 400 of FIG. 4. As shown in FIG. 5, the request is transmitted upstream from the requesting STT 502 to the HE 102 or LNE 104 via illustrative communications network 100. Subsequently, the requested video segment is narrowcast downstream from the HE 102 or LNE 104 to the group 504 which includes the requesting STT 502 via the network 100.

III. Demand-Cast System

1. Demand-cast Overview

In accordance with an embodiment of the present invention, video segments may be delivered using a demand-cast system. The demand-cast system may be, for example, a two-way system requiring communication between STT users on the cable network and the head-end via a back-channel.

In accordance with one embodiment of the present invention, such video segments may include multiple previews and advertisements incorporated into an interactive program guide (IPG). For example, a preview of a broadcast program may be made available via the IPG such that the user may select and play the preview. The following discusses demand-casting video segments incorporated into an IPG.

The demand-cast video segments may be inserted in multiplexed transport stream for temporary broadcast based on access demand generated by STT users on the cable network. When a request for a video segment is made by a particular STT, the STT requests from the head-end that the corresponding stream be inserted in the multiplexed transport stream. The head-end then inserts the requested stream into the multiplexed transport stream.

When a STT requests that a new demand-cast video segment be inserted into the multiplexed transport stream, if there is no slot available in the multiplexed transport stream, the head-end refuses to insert a newly requested video segment resulting in a blockage. All statistical systems are susceptible to blockage if loaded with too many users or in the case of rare chaotic episodes.

2. System Description

Figure 6:
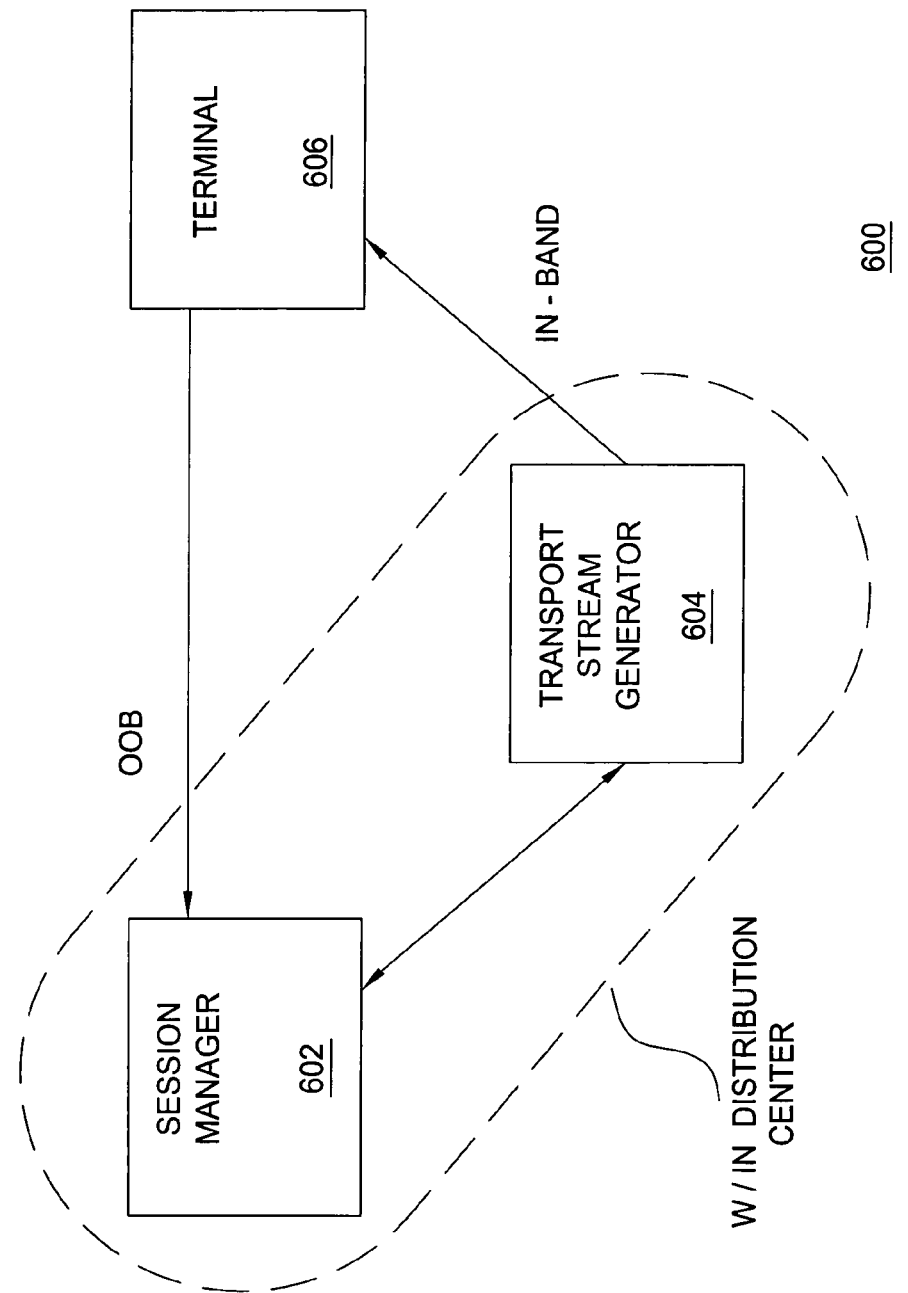
FIG. 6 depicts a two-way system for efficient delivery of demand-cast video segments in accordance with an embodiment of the present invention.

FIG. 6 depicts a two-way system 600 for efficient delivery of demand-cast video sequences in accordance with an embodiment of the present invention. The system 600 includes a session manager (SM) 602 and a transport stream generator (TSG) 604.

Both the SM 602 and the TSG 604 may be, for example, co-located at a distribution center. The distribution center may comprise, for example, a headend 102 in the illustrative distribution system 100. Alternatively, the SM 602 and the TSG 604 may be at different locations. For example, the SM 602 may be at a headend 102, and the TSG 604 may be at local neighborhood equipment 104 in the illustrative distribution system 100.

Both the SM 602 and the TSG 604 are coupled to a plurality of terminals 606 via a distribution network. The distribution network may comprise, for example, the cable distribution network 100 illustrated in FIG. 1. In that example, the terminals 606 would comprise set-top terminals 108 or the equivalent functionality integrated into a computer system or advanced television. Alternatively, for example, the distribution network may comprise a satellite communications system or another type of communications system (telephonic, wireless, etc.).

In one embodiment, the terminal 606 receives in-band communications from the TSG 604 and sends out-of-band (OOB) communications to the SM 602. In an alternative embodiment, the communications to the SM 602 may comprise upstream in-band communications.

The session manager (SM) 602 may comprise, in one embodiment, a computer system residing at a cable headend 102. The computer system may comprise, for example, a computer server running a version of the UNIX (or alternatively Windows) operating system. The computer system may receive out-of-band communications from the terminals 606 by way of a connection to the network controller. For example, the connection may comprise an Ethernet connection, and the network controller may comprise one from General Instruments (now part of Motorola) or another supplier. The computer system also communicates with and controls the transport stream generator 604 by way of a network connection such as an Ethernet connection.

The SM 602 manages delivery of the IPG to terminals 606 on multiple cable nodes each served by a separate multiplexed transport stream generated at a TSG 604. The SM 602 also monitors demand-cast stream usage by the terminals 606. It tracks IPG demand-cast streams that are acquired by at least one terminal 606 by maintaining a dynamic list of terminals 606 using each stream. This is done for each multiplexed transport stream managed by the SM 602. The SM 602 also accepts messages from terminals 606 indicating that they have acquired, released, or requested demand-cast streams. A terminal 606 that has acquired a demand-cast stream is registered to the stream, and a terminal 606 that has released a demand-cast stream is removed from the registry for the stream. The SM 602 informs the corresponding TSG 604 once there is no logner any terminals 606 registered to a particular demand-cast stream. It also informs the TSG 604 when a terminal 606 requests a demand-cast stream. In one embodiment, the SM 602 may time-out acquisition of a stream by any terminal 606 if the terminal 606 has not released the stream within a period of time (for example, a few minutes). The time-out may be implemented by removing the particular terminal 606 from the registry for the stream.

The transport stream generator (TSG) 604 may comprise, in one embodiment, a computer system residing at a cable headend 102. The computer system may comprise, for example, a computer server running a version of the Windows (or alternatively UNIX) operating system. Alternatively, the TSG 604 may be located separately from the SM 602, for example, at local neighborhood equipment 104. Each TSG 604 is coupled to a SM 602, for example, via an Ethernet network. The TSG 604 may generate one or more multiplexed transport stream, each broadcast to a respective node in the distribution system.

In one embodiment, the multiplexed transport stream comprises a MPEG transport stream. In this case, the TSG 604 may communicate with the terminals 606 by way of tables in the private section of the MPEG transport stream. Such a table may include a list of available demand-cast streams, along with the address of the source TSG 604 and information to identify the particular multiplexed transport stream to which the table belongs.

The TSG 604 manages each multiplexed transport stream which it generates. The TSG 604 receives information from the SM 602 indicating whether each demand-cast stream being served is currently being acquired by any terminal 606 or not. In other words, the TSG 604 is informed by the SM 602 when there is no longer any terminals 606 acquiring a demand-cast stream.

In one embodiment, the TSG 604 maintains a status for each variable demand-cast stream being served. The status is adjusted upon receipt by the TSG 604 of certain messages from the SM 602. The basic states for the status comprise an "acquired" state which denotes that the demand-cast stream is in use by one or more terminals 606, and a "released" state which denotes that that the demand-cast stream is not in use by any terminal 606. The TSG 604 keeps serving "acquired" demand-cast streams by multiplexing them into appropriate transport streams and replaces "released" demand-cast streams with new demand-cast streams upon receipt of a request message from the SM 602. In a preferred embodiment, the TSG 604 also keeps track of the order in which the streams are released, so that the oldest released stream may be used as the preferred candidate for replacement.

If all the demand-cast streams in a particular multiplexed transport stream are "acquired," then a new stream cannot be inserted, and so the TSG 604 refuses the request. In such a case, a message indicating such a refusal may be sent to the SM 602 and/or the requesting terminal 606.

In one embodiment, the terminal 606 comprises a set-top terminal (STT) for use by a service subscriber. The STT may comprise an embedded system which includes a tuner, a demultiplexer, and a decoder. The STT drives the subscriber's display unit or TV set, and it may be connected to the TSG 604 by way of a RF feed from a cable distribution network. The IPG content may be received from a particular multiplexed transport stream on a specific QAM carrier signal. In one embodiment, the multiplexed transport stream may comprise an ensemble of elementary MPEG video streams, each representing a portion of the guide.

In one embodiment, the terminal 606 includes client application software which is resident at the terminal 606. The client application is responsible for presenting the video segments to the subscriber. The client application demultiplexes and decodes video segments requested by the user. If a requested segment is already being received via the multiplexed transport stream, then the Client application acquires the stream immediately and sends a message to the SM 602 that it has acquired the stream. If the requested segment is not in the multiplexed transport stream, then the client application sends a request message to the SM 602. Subsequently, the client application acquires the stream once it is received. In addition, when a stream is no longer being acquired, the client application sends a release message to the SM 602. In one embodiment, if there is no remote control or other activity by the user for a period of time (for example, a few minutes), then the client application times-out the acquisition. The time-out may be accomplished, for example, by sending a release message to the SM 602 and acquiring a broadcast stream instead.

3. Description Per Major Module

The demand-cast system may include of three major subsystems: the set top terminal (STT); the session manager (SM); and the transport stream generator (TSG.) A description of each subsystem follows.

A. STT (Set-Top Terminal)

The set top terminal may be the end-user or cable service subscriber tuner/demultiplexer/decoder and embedded system. The STT may be an apparatus similar to the General Instruments DCT-2000. It is connected to the cable operator RF feed. It drives the subscribers display unit or TV set. The video segments may be received via a multiplexed transport stream (or multiplex, for brevity) located on a specific QAM carrier. The multiplex contains an ensemble of elementary MPEG video streams each representing portions of the guide. Some of these streams are guide grid segments. The STT receives messages from the head-end via tables in the private section of the transport stream (in-band messaging.) The STT sends messages to the head-end via the out-of-band return path.

The client application may be a set top terminal resident program responsible for presenting an Interactive Program Guide including video segments to the subscriber. The client application demultiplexes and decodes video segments requested by the user. If a particular video segment is in the multiplexed transport stream, the STT acquires the stream immediately and informs the SM that it has requested it. If the video segment is not in the multiplex, the STT also sends a message to the SM that it has requested it. Then the STT acquires the stream once it's in the multiplex. When the STT no longer is acquiring the stream, it informs the SM that the stream has been released.

B. SM (Session Manager) The session manager may be a computer residing at the cable head-end. The SM may be a SPARC Station running Solaris. It may be connected via Ethernet to the server side of a General Instruments network controller (NC) and may include a receiver for OB return path messages originating from STTs. The SM can handle STTs on multiple cable nodes each served by a separate multiplex. The SM communicates and controls the TSGs via Ethernet. The TSGs generate the transport streams.

The SM manages one or multiple cable networks and monitors demand-cast stream usage. It tracks demand-cast streams that are acquired by at least one STT maintaining a dynamic list of STTs that are using them. This is done for each multiplex managed by the SM. The SM accepts messages from STTs indicating that they have requested or released demand-cast streams. A STT that has acquired a demand-cast stream is registered to the stream and a STT that has released a demand-cast stream is removed from the streams registry. The SM informs the TSG once there are no longer any STTs on a particular demand-cast stream. It also informs the TSG when a STT requests a demand-cast stream.

C. TSG (Transport Stream Generator) The transport stream generator is a computer residing at the cable head-end. Currently, the TSG is a PCI WinNT system. It is connected via Ethernet to the SM controlling it. The TSG produces one or more transport streams each broadcast to their respective nodes. The TSG communicates with the STTs by way of tables in the private section of the transport streams. The table contains the list of available demand-cast streams along with the IP address of the source TSG (its IP address) and the channel number of the multiplex.

The TSG manages each multiplexed transport stream that it generates. It receives information from the SM on each demand-cast stream indicating whether the stream is currently acquired by any STT or released by all STTs. The TSG is informed by the SM when there is no longer any STT on a demand-cast stream. The TSG is informed by the SM when a STT requests a demand-cast stream. The TSG maintains status for all the demand-cast streams in each multiplex. It adjusts the status for each stream for which it receives a message from the SM. The basic status is 'acquired' for streams in use by one or more STTs or 'released' for streams that are not in use by any STT. The TSG keeps 'acquired' streams in its multiplexes and replaces 'released' streams with new demand-cast streams upon request. It also keeps track of which are the few oldest 'released' stream. The best candidate for replacement is always the oldest 'released' stream. If all the demand-cast streams in the multiplexes are 'acquired' then a new stream can not be inserted and the TSG refuses the request.

IV. Example of Interactive Program Guide

In accordance with an embodiment of the present invention, a video segment (and associated audio) may be delivered as part of an interactive program guide (IPG). An example of such an IPG is described below. The example is described for purposes of illustration and is not meant to limit the scope of the present invention.

Figure 7:
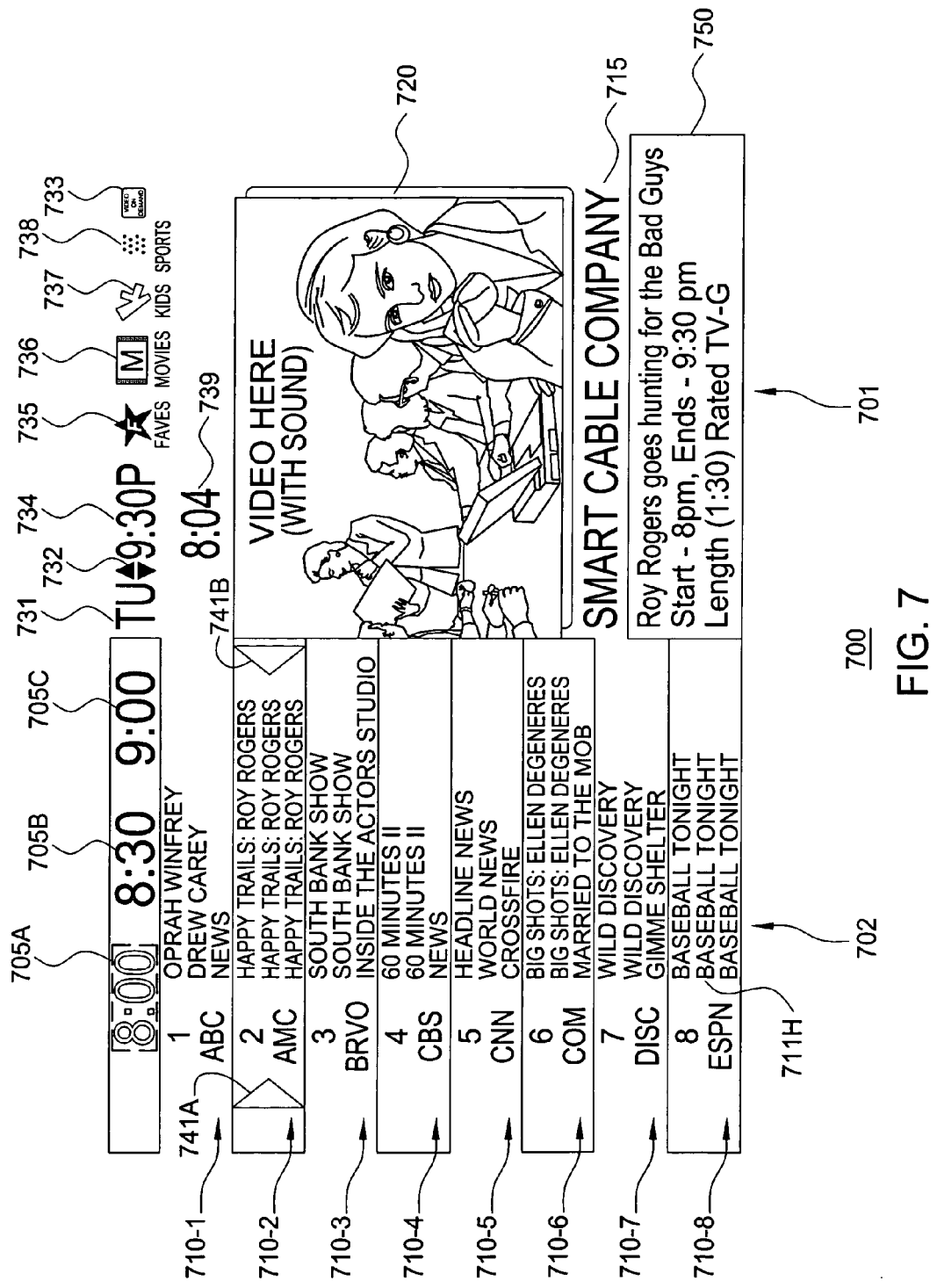
FIG. 7 illustrates an example of an interactive program guide (IPG) screen in accordance with an embodiment of the present invention.

FIG. 7 depicts an example of an IPG screen in accordance with an embodiment of the present invention. The video segment 700 of FIG. 7 comprises a first 705A, second 705B and third 705C time slot objects, a plurality of channel content objects 710-1 through 710-8, a specific content object 711H, a pair of channel indicator icons 741A, 741 B, a video barker 720 (and associated audio barker), a cable system or provider logo 715, a program description region 750, a day of the week identification object 731, a time of day object 739, a next time slot icon 734, a temporal increment/decrement object 732, a "favorites" filter object 735, a "movies" filter object 736, a "kids" (i.e., juvenile) programming filter icon 737, a "sports" programming filter object 738 and a VOD programming icon 733. It should be noted that the day of the week object 731 and next time slot icon 734 may comprise independent objects (as depicted in FIG. 7) or may be considered together as parts of a combined object.

In a system, illustratively, comprising 60 channels of information, the channels are displayed in 8-channel groups having associated with them three hour time slots. In this organization, it is necessary to provide 10 video PIDs to carry the present-time channel/time/title information, one or more audio PID to carry the audio barker and/or one or more data PID (or other data transport method) to carry the program description data, overlay data and the like. To fully broadcast interactive program information up to 24 hours in advance, it is necessary to provide 160 (10*24/1.5) video PIDS, along with one or more audio and, optionally, one or more data PIDs. The amount of time provided for in broadcast video PIDs for the given channel groups comprises the time depth of the program guide, while the number of channels available through the guide (compared to the number of channels in the system) provides the channel depth of the program guide. In a system providing only half of the available channels via broadcast video PIDs, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours.

The video streams representing the IPG may be carried in a single transport stream or multiple transport streams, within the form of a single or multi-programs. A user desiring to view the next 1.5 hour time interval (e.g., 9:30-11:00) may activate a "scroll right" object (or move the joystick to the right when a program within program grid 702 occupies the final displayed time interval). Such activation results in the controller of the STT noting that a new time interval is desired. The video stream corresponding to the new time interval is then decoded and displayed. If the corresponding video stream is within the same transport stream (i.e., a new PID,), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

A user interaction resulting in a prior time interval or a different set of channels results in the retrieval and presentation of a related video stream. If the related video stream is not part of the broadcast video streams, then a pointcast session, for example, may be initiated as described above in relation to FIGS. 2 and 3. For this purpose, the STT sends a request to the head end via the back channel requesting a particular stream. The head end then processes the request, retrieves the related stream from the information server, incorporates the stream within a transport stream as a video PID (preferably, the transport stream currently being tuned/selected by the STT) and informs the STT which PID should be received, and from which transport stream it should be demultiplexed. The STT then retrieves the related video PID. In the case of the video PID being within a different transport stream, the STT first demultiplexes the corresponding transport stream (possibly tuning a different QAM stream within the forward channel).

Normally, upon completion of the viewing of the desired stream, the STT indicates to the head end that it no longer needs the stream, whereupon the head end tears down the pointcast session. The viewer is then returned to the broadcast stream from which the pointcast session was launched.

Frequently accessed video segments, such as those in the current time slot and near look-ahead time slots and perhaps prime-time slots, may be broadcast constantly so as to remain accessible with low latency. Less frequently accessed far look-ahead pages may be pull demand-cast.

In accordance with an embodiment of the present invention, the IPG may contain video objects to provide access to video segments (and associated audio segments). For example, the video barker 720 may be configured to be such a video object.

The user interface action sequence to initiate a request for the video segment may occur in various different ways. For instance, the video object may be selected using a select button on a remote when a cursor is on the video object. Alternatively, other selection methods may be used, and additional functionality may be provided via pop-up menus and other user interface means to increase the user-friendliness of the terminal system. For instance, a separate remote button may be used to provide a pop-up menu with a list of video segments available at a headend.

The terminal then sends the request for the video segment to the headend for the headend to deliver (or re-deliver) the video segment from its start time. Upon receiving the request, equipment at the headend may re-compose a video sequence for the IPG screen with the time-shifted video segment, then encode and deliver the re-composed video sequence for the IPG screen to the viewer. The equipment at the headend may execute this process only for the requesting viewers.

V. Messaging Protocal

Returning attention to the system 600 of FIG. 6, the following describes a messaging protocol for communicating between the major components of the system 600. The messaging protocol is described in relation to FIGS. 8-11. Although a specific messaging protocol is described below, the present invention is not meant to be limited to that specific protocol.

First, the "source" transport stream generator (TSG) 604 communicates to a terminal 606 via, for example, a one-way in-band channel. The communication may be, for example, in the form of a "demand-cast index table" within a private section of the MPEG transport stream. FIG. 8 depicts an embodiment for the content of the demand-cast index table. The content may include: (a) a table version number (which increments when the table content changes); (b) a list of available demand-cast streams; (c) an internet protocol (IP) address for the source TSG; (d) a MUX channel number within the source TSG, and (e) a time of day and day of week.

Second, the terminal 606 communicates with the session manager (SM) 602 via, for example, a one-way out-of-band return path. The return path may be implemented, for example, using a user datagram protocol/internet protocol (UDP/IP) service to connect the terminal 606 to a network controller (NC) at the SM 602. FIG. 9 depicts one embodiment for the contents of the messages sent from the terminal 606 to the SM 602. The message content as shown includes: (a) a demand-cast stream identification; (b) the terminal's identification; (c) the IP address of the source TSG; (d) the MUX channel number within the source TSG; and (e) the message information itself. The message information may indicate: (1) an acquisition of the demand-cast stream by the terminal 606; (2) a release of the demand-cast stream by the terminal 606; or (3) a request for the demand-cast stream by the terminal 606.

Third, the SM 602 communicates with the source TSG 604 via, for example, a two-way communications channel. The two-way communications channel may comprise, for example, a TCP/IP connection over an Ethernet network. FIG. 10 depicts one embodiment for the contents of the messages sent from the SM 602 to the TSG 604. The message content as shown includes: (a) the demand-cast stream identification; (b) the MUX channel number within the source TSG; and (c) a message/command from a set of messages/ commands. The set of messages/commands include: (1) demand-cast stream released (no longer acquired by any terminal); (2) demand-cast stream requested; and (3) a reset command.

Messages from the SM 602 to the TSG 604 may be acknowledged by the TSG 604. FIG. 11 depicts one embodiment for the contents of the acknowledgement messages sent by the TSG 604 back to the SM 602. An acknowledgement message as shown includes: (a) the demand-cast stream ID; (b) the MUX channel number; (c) the TSG's address; and (d) the acknowledgement itself. The acknowledgement may convey acknowledgement of: (1) release of the demand-cast stream; (2) request for the demand-cast stream; or (3) reset of the TSG 604.

VI. Stream Status and Conversions of Status

The following relate to stream status and conversions of status in accordance with a preferred embodiment of the present invention. Although a specific embodiment of stream status and conversions of status is described below, the present invention is not meant to be limited to that specific embodiment.

1. Stream Status Within Multiplexed Transport Stream

The TSG 604 models bandwidth usage for each multiplexed transport stream that it is managing. Each demand-cast stream within each transport stream may be either active or inactive. Active streams are currently being multiplexed into the transport stream. Inactive streams are not currently being multiplexed into the transport stream.

Figure 12:
FIG. 12 depicts an example showing status of active demand-cast streams in a multiplexed transport stream generated by a TSG.

FIG. 12 depicts an example showing statuses of active demand-cast streams in a multiplexed transport stream generated by a TSG. For each demand-cast stream, TSG assigns status with respect to the streams intended multiplex. Demand-cast stream status, in context of the TSG, are:

1) 'active' streams are in the multiplex
1.1) 'acquired' demand-cast streams are in the multiplex and are used by at least one STT. They are referenced in the demand-cast index table in the private section of the transport stream. They are not candidates for removal.
1.2) 'released' demand-cast streams are in the multiplex and are not used by any STT. They are referenced in the demand-cast index table. They can become 'passive.'
1.2.1) 'passive' demand-cast streams are also technically 'released'. They are in the multiplex and are not used by any STT. They are not referenced in the demand-cast index table. They are typically a small fraction of the 'released' demand-cast streams. The oldest few 'released' demand-cast streams are forced to 'inactive' status by a maintenance thread. They are candidates for removal.
2) 'inactive' demand-cast streams are not in the IPG multiplex. They are not referenced in the demand-cast index table. They may be inserted in the multiplex.

Note that the TSG may remove all the 'passive' demand-cast streams from their respective multiplexes and replace them with null packets. It is however advantageous to leave 'passive' demand-cast streams in the multiplex because if a STT attempts to acquire it, latency will be minimized.

2. Conversions of Status

The TSG receives messages from the SM. Messages received from the SM are:
1) "request demand-cast stream"
2) "release demand-cast stream" The "release demand-cast stream" message includes the maximum number of STTs that were registered to the demand-cast stream.
3) "reset"

While specific embodiments and applications of the present invention have been illustrated and described, it is to be understood that the invention is not limited to the precise configuration and components disclosed above. Various modifications and variations which will be apparent to those skilled in the art may be made in the arrangement, operation, and details of the method and apparatus of the present invention disclosed herein without departing from the spirit and scope of the invention.

For example, in another embodiment, video segments in a small-size window may be overlayed on a channel program being broadcast. Such video segments may be set to begin playing at the time of viewer selection of the channel. In this embodiment, the video-segment overlay may be configured to be removable by a viewer at any time by use of a remote button to turn off this overlay feature. Since the video segments may be stored at equipment at a headend, a small-size window displaying a video segment may be overlayed on any desired program channel at the headend and the resultant video sequence delivered to the viewer. In this embodiment, the overlay position on the screen may be configurable by a viewer. The viewer would be able to define the coordinates of the overlay position and send the coordinates to the headend. Upon receiving the coordinates, the equipment and the headend would re-composite the video sequence with the video segment overlay at the defined coordinates.

In an additional embodiment, the short-time duration video segments may be delivered as part of a video-on-demand (VOD) service. Such a VOD service may be separate from an IPG context, but may be merged with a shopping mall context.

In yet another embodiment, the video segments may be delivered with a custom interactive program guide (custom IPG). Such a custom IPG may be delivered in a channel independent of the program channels and independent of the regular (non-custom) IPG channel. In one application, the video segments may be used to provide functionality to make offers for sale as part of a home shopping network integrated with the custom IPG.

Figure 13:
FIG. 13 depicts a matrix of program guide data configured to present a different video for each PID.

FIG. 13 depicts a matrix 1300 of program guide data configured to present a different video for each PID. Matrix 1300 can be used to support, for example, look-ahead time selection in which a preview clip is provided for each PID. In this case, the guide data in the PIDs is the same (e.g., a list of eight channels) and the video data varies from PID to PID. Thus, each PID in matrix 1500 carries its own preview video clip for its channel.

For matrix 1300, the guide data (represented as g1 in FIG. 13) can be encoded along with the first image of a reference PID as an I frame. Each of the remaining non-reference PIDs can be encoded independently as a different video sequence (e.g., a1, a2, a3, and so on). However, since the guide data portion (g1) is the same for the PIDs, it can be omitted from processing and transmission.

Specifically, for time t1, the guide and video data for one of the PIDs (e.g., g1, v1 for PID1) can be encoded as the reference I frame. Subsequently, the video portions of the remaining pictures within the GOP for this PID can be encoded based on the reference I frame. The video portions at time index t1 for each of the remaining PIDs (e.g., PID2 through PID8) can be encoded as an I frame. Alternatively, the video portion at time index t1 for each remaining PID can be coded as a P frame based on the reference I frame.

For example, the guide data (g1) and video data (v1) for PID1 at time index t1 can be encoded as the reference I frame. For the next picture of PID1 at time index t2, the video data (v2) is extracted and encoded as a B picture based, in part, on the video data (v1) at time index t1. The guide data (g1) at time t2 can be omitted from processing. The encoding for PID1 continues in similar manner for the remaining pictures at time indices t3 through t15. For PID2, the video data (a1) at time index t1 can be coded as an I frame, and the video data (a2, a3, and so on) for time indices t2 through t15 can be encoded as P and B frames based on the I frame generated for PID2 at time index t1.

The decoding for data structure 1300 can be performed (e.g., at the STT) as follows. Initially, the reference I frame is constructed and stored. If a particular PID is selected for viewing, the video sequence for that PID is constructed and combined with the previously constructed and stored guide data. The decoded video sequence is thus presented along with the guide data available in the decoded reference frame.

What is claimed is:

1. A system, comprising:
a transport stream generator for generating a plurality of multiplexed transport streams; and
a session manager, coupled to the transport stream generator, for managing the transport stream generator to control delivery of the generated plurality of multiplexed transport streams and for monitoring demand-cast stream usage by terminals to provide to the transport stream generator for maintaining status for demand-cast streams acquired by user terminals;
wherein the transport stream generator continuously generates a multiplexed transport stream providing data and program guide video segments for an interactive program guide (IPG), wherein the plurality of program guide video segments include a first set of program guide video segments and a second set of program guide video segments;
wherein the session manager manages delivery of the IPG and identifies demand-cast program guide video segments accessed frequently by the terminals and demand-cast program guide video segments accessed less frequently including demand-cast program guide video segments specifically requested by a terminal; and
wherein the session manager causes the transport stream generator to provide demand-cast program guide video segments identified by the session manager as being accessed frequently in the first set of program guide video segments for continuous broadcast within the same multiplexed transport stream as the IPG for constant availability at the terminals and to provide a requested demand-cast program guide video segment corresponding to one of the less frequently accessed demand-cast program guide video segments into the transport stream in the second set of video segments upon receipt of a request by the session manager from one of the terminals for access to the requested demand-cast video segment as a pull demand-cast provided only upon request from one of the terminals.

2. The system of claim 1, wherein the transport stream generator and the session manager are disposed at a set of local neighborhood equipment.

3. The system of claim 1, wherein the transport stream generator is disposed at a set of local neighborhood equipment and the session manager is disposed at a headend.

4. The system of claim 1, wherein one of the plurality of terminals sends a request to the session manager for one of the less frequently accessed video segments when a user selects a video object in the IPG.

5. The system of claim 1, wherein the less frequently accessed second set of video segments include a plurality of previews and a plurality of advertisements.

6. The system of claim 1, wherein the session manager monitors a terminal for release of a requested demand-cast video segment and de-registers the terminal from a transport stream registry after a period of time within which the terminal did not release the demand-cast video segment.

7. The system of claim 1, wherein the session manager registers one of the terminals to a transport stream registry, after the terminal requests a demand-cast video segment.

8. The system of claim 1, wherein the multiplexed transport streams include a private section, the private section including a table providing a list of available demand-cast streams, the transport stream generator communicating with the plurality of terminals using the table in the private section of the multiplexed transport streams.

9. The system of claim 1, wherein the terminal sends a request for a demand-cast video segment via a back channel.

10. The system of claim 1, wherein the frequently accessed video segments include video segments associated with current time slots and near look-ahead time slots.

11. The system of claim 1, wherein the frequently accessed video segments include video segments associated with prime-time slots.

12. The system of claim 1, wherein the less frequently accessed video segments include far look-ahead pull demand-cast video segments.

13. The system of claim 1, wherein the request includes a demand-cast stream identification, an identification of the request terminal, the IP address of a source transport stream generator, and a MUX channel number within the source transport stream generator.

14. The system of claim 8, wherein the table includes a table version number, a list of available demand-cast streams, an internet protocol (IP) address for a source transport stream generator, a MUX channel number within the source transport stream generator, and a time of day and day of week.

15. The system of claim 14, wherein the terminal sends a request for a demand-cast video segment via a back channel.

16. The system of claim 15, wherein the frequently accessed video segments include video segments associated with current time slots and near look-ahead time slots.

17. The system of claim 16, wherein the frequently accessed video segments include video segments associated with prime-time slots.

18. The system of claim 17, wherein the less frequently accessed video segments include far look-ahead pull demand-cast video segments and wherein the request includes a demand-cast stream identification, an identification of the request terminal, the IP address of a source transport stream generator, and a MUX channel number within the source transport stream generator.

* * * * *

UNITED STATES PATENT AND TRADEMARK OFFICE
CERTIFICATE OF CORRECTION

PATENT NO. : 8,255,956 B2  
APPLICATION NO. : 11/400691  
DATED : August 28, 2012  
INVENTOR(S) : Bayrakeri et al.

Page 1 of 1

It is certified that error appears in the above-identified patent and that said Letters Patent is hereby corrected as shown below:

Col. 10, line 24: "V. Messaging Protocal" should read --V. MESSAGING PROTOCOL--

Signed and Sealed this  
Ninth Day of April, 2013

Teresa Stanek Rea  
*Acting Director of the United States Patent and Trademark Office*